United States Patent [19]

Jyan-Tsai

[11] Patent Number: 5,362,089
[45] Date of Patent: Nov. 8, 1994

[54] FOLDABLE BABY STROLLER

[76] Inventor: Guo Jyan-Tsai, 43, Alley 71, Lane 173, Section 2, Dong Dah Road, Shin Jwu City, Taiwan, Prov. of China

[21] Appl. No.: 199,582
[22] Filed: Feb. 22, 1994
[51] Int. Cl.⁵ .............................................. B62B 9/20
[52] U.S. Cl. .......................... 280/655.1; 280/47.371; 403/85; 403/325
[58] Field of Search ..................... 280/642, 644, 655.1, 280/47.371, 47.315, 42, 649, 650; 403/85, 324, 325

[56] References Cited

U.S. PATENT DOCUMENTS

| | | | |
|---|---|---|---|
| 2,617,670 | 11/1952 | Welsh | 280/642 X |
| 2,724,598 | 11/1955 | Knarzer | 280/47.371 |
| 2,786,694 | 3/1957 | Gray | 280/47.371 |
| 3,694,855 | 10/1972 | Meyer et al. | 280/655.1 X |
| 4,832,361 | 5/1989 | Nakao et al. | 280/642 |
| 4,834,403 | 5/1989 | Yanus et al. | 280/47.315 X |
| 4,993,743 | 2/1991 | Takahashi et al. | 403/85 X |
| 5,029,886 | 7/1991 | Takahashi et al. | 280/642 X |
| 5,257,799 | 11/1993 | Cone et al. | 280/47.371 X |

FOREIGN PATENT DOCUMENTS 3437276  4/1986  Germany ......................... 280/47.371

Primary Examiner—Brian L. Johnson
Assistant Examiner—Carla Mattix

[57] ABSTRACT

A baby stroller includes a pair of front legs, two handles and two rear legs pivotally coupled together, each of the supports has a member fixed on the upper end of the front leg and pivotally coupled to the lower end of the handle, a sleeve slidably engaged on the lower end of the handle, a knob pivotally secured to the lower end of the handle for engaging with the sleeve, and a protrusion extended from the member for engaging with the knob. The protrusion is retained in place by the knob when the sleeve is biased toward the knob and is disengaged from the knob when the knob is rotated such that the handle is rotatable relative to the front legs.

1 Claim, 8 Drawing Sheets

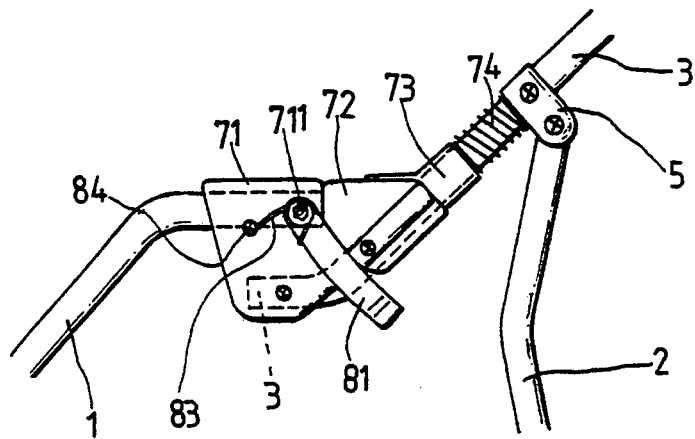
FIG7-A
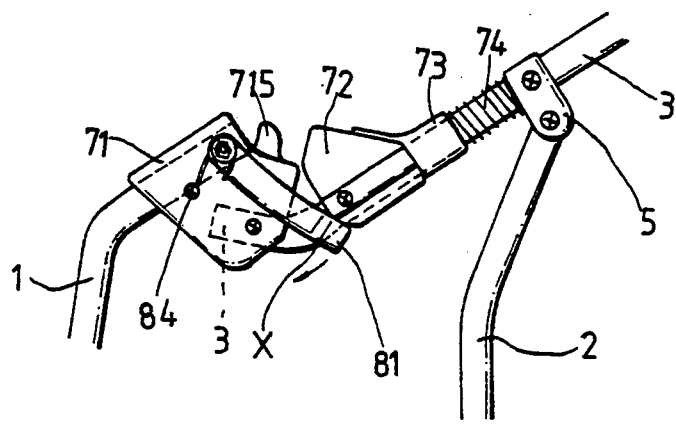
FIG7-B
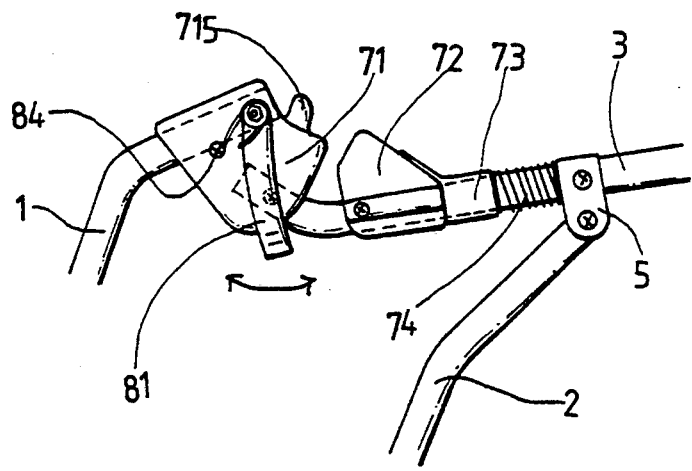
FIG7-C

FOLDABLE BABY STROLLER

BACKGROUND OF THE INVENTION

1. Field of the Invention

The present invention relates to a baby stroller, and more particularly to a foldable baby stroller.

2. Description of the Prior Art

Various kinds of baby strollers have been developed and widely used, in which one typical baby stroller is shown in FIG. 1 and comprises a pair of front legs 100, a pair of handles 120 having lower ends pivotally coupled to the front legs 100 by two couplers 110, a pair of rear legs 130 pivotally coupled to the handles 120 by two couplers 111, a foldable rod 150 pivotally coupled between the rear legs 130 by two couplers 140, two pairs of foldable frames 160, 180 disposed in the bottom and the rear portion respectively, a pair of arms 170 pivotally coupled between the front legs 100 and the rear legs 130, and a foldable beam 190 coupled to the rear frame 180, however, the handles 120 can not be adjusted relative to the legs.

As shown in FIG. 2, another typical baby stroller is shown and comprises a pair of front legs 100, a pair of rear legs 200 and a handle means 300 pivotally coupled together by couplers 400, and a base 500 secured between the legs 100, 200, in which the front legs 100 are slightly curved so as to enlarge the bottom portion of the stroller such that the children can be stably supported in the stroller, however, the handles 300 also can not be adjusted relative to the legs 100, 200.

As shown in FIG. 3, still another typical baby stroller is shown and comprises a pair of front legs 100, a pair of rear lens 200, a pair of handles 300 pivotally coupled together, the front legs include two bent portions 210 coupled with two bent portions 410 of the handles 300 by two couplers 510, a foldable frame 700 coupled to the back portion of the stroller by two couplers 600, and a foldable beam 800 disposed between the rear legs 200, the bent portions 210, 410 form a means for supporting the arms of the children, however, the handles 300 also can not be adjusted relative to the legs.

The present invention has arisen to mitigate and/or obviate the afore-described disadvantages of the conventional baby strollers.

SUMMARY OF THE INVENTION

The primary objective of the present invention is to provide a foldable baby stroller which includes an adjustable support means for supporting the arms of the children seated on the baby stroller.

In accordance with one aspect of the invention, there is provided a baby stroller comprising a pair of front legs each including an upper end, a pair of support means disposed on the upper ends of the front legs, a handle means including two lower ends engaged with the support means respectively, two couplers secured on the lower ends of the handle means, two rear legs each including an upper end pivotally coupled to the couplers respectively; each of the support means including a member fixed on the upper end of the front leg at a first pin and pivotally coupled to the lower end of the handle means at a second pin, a protrusion extended from the member, a retainer pivotally coupled to the first pin for engaging with the lower end of the handle means, first biasing means biasing the retainer to engage with the lower end of the handle means, a sleeve slidably engaged on the lower end of the handle means and including a lump formed thereon, a knob pivotally secured to the lower end of the handle means for engaging with the lump of the sleeve and including an opening for engaging with the protrusion of the member, second biasing means for biasing the sleeve toward the knob, the protrusion being retained in the opening of the knob when the sleeve is biased toward the knob by the second biasing means, and the protrusion being disengaged from the knob when the knob is rotated to move the sleeve against the second biasing means such that the handle means is rotatable about the second pin, the retainer being biased to engage with the lower end of the handle means by the first biasing means for retaining the handle means in place relative to the front leg.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 7A, 7B, 7C are plane views illustrating the operation of the adjustable support means.

DETAILED DESCRIPTION THE PREFERRED EMBODIMENT OF

Figure 1:
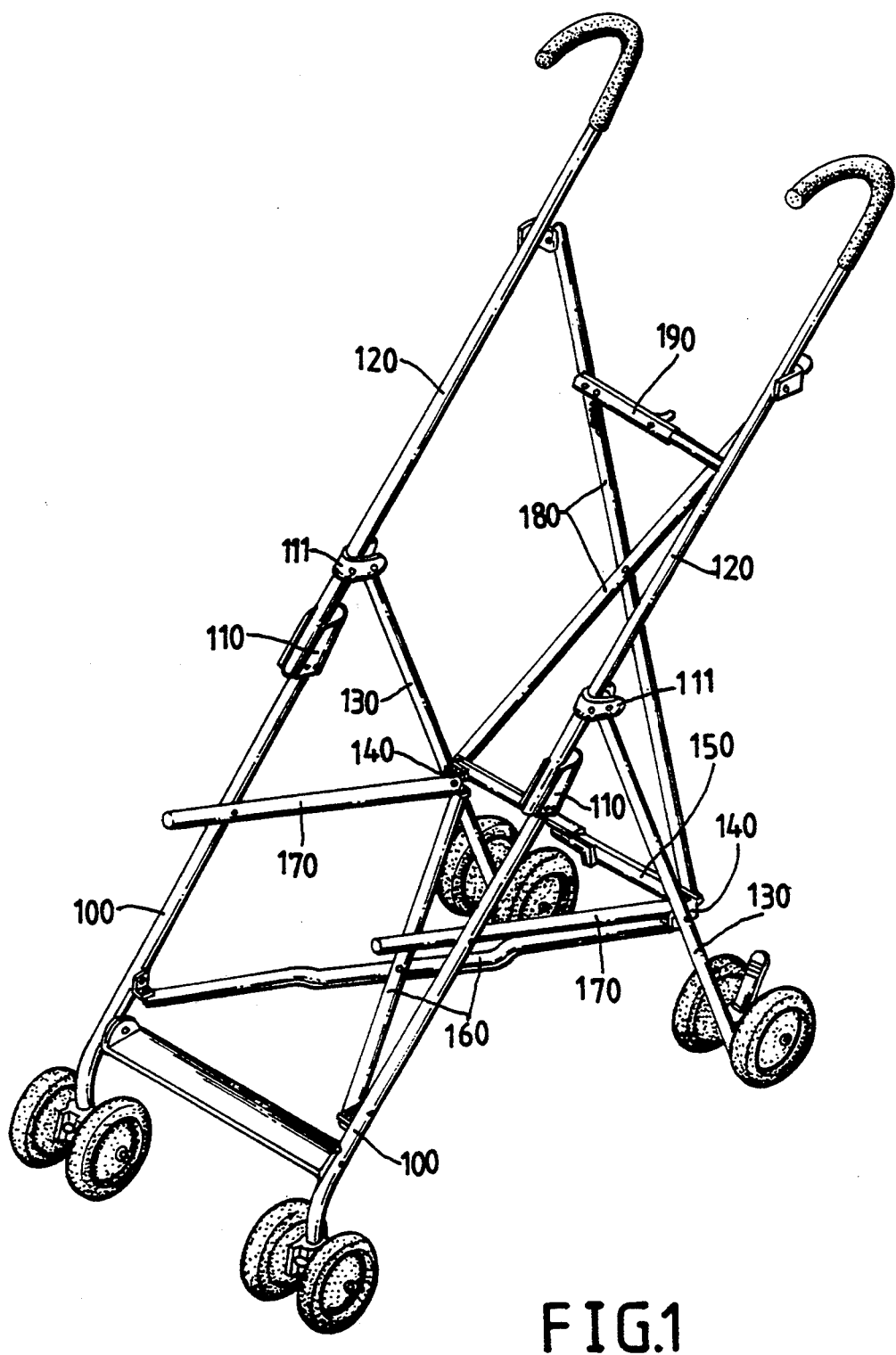
FIGS. 1, 2 and 3 are perspective views showing three typical baby strollers.
Figure 2:
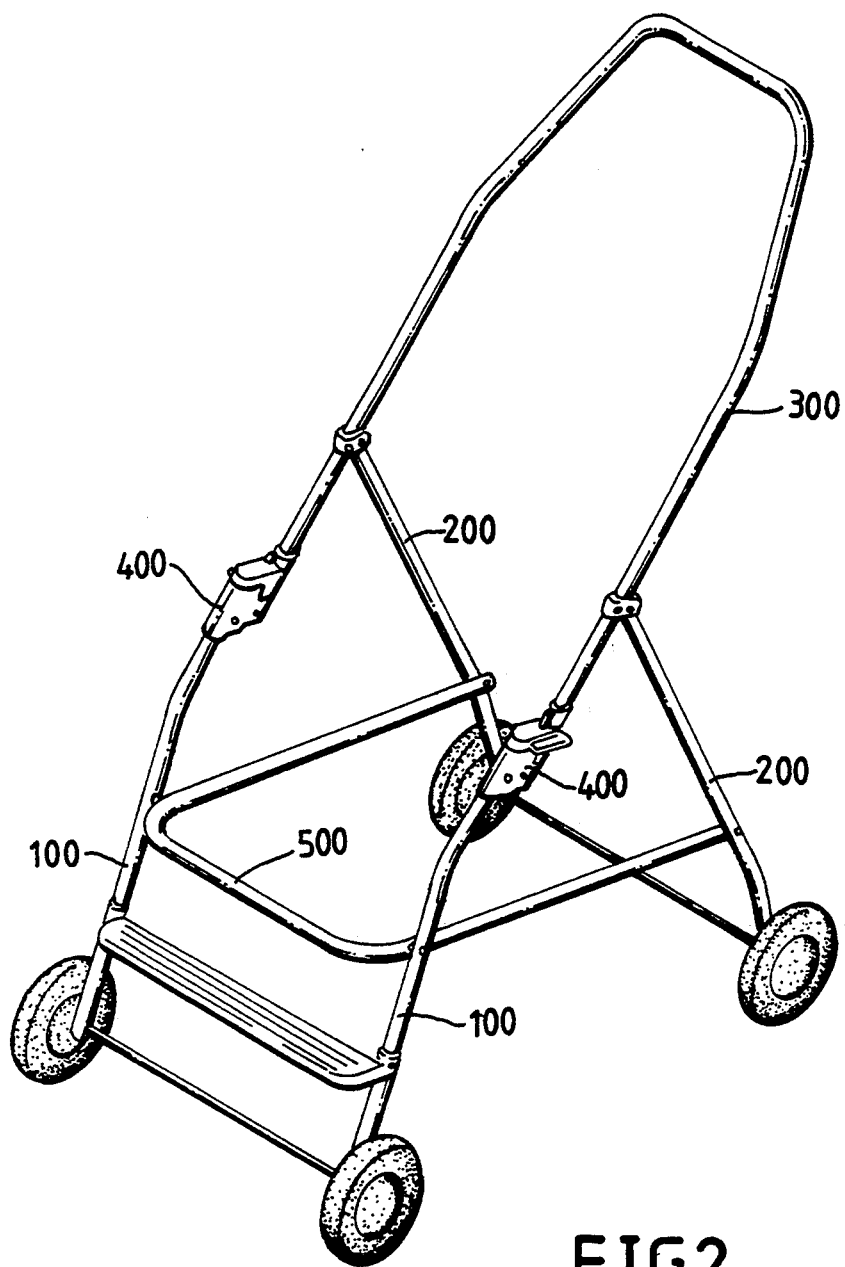
Figure 3:
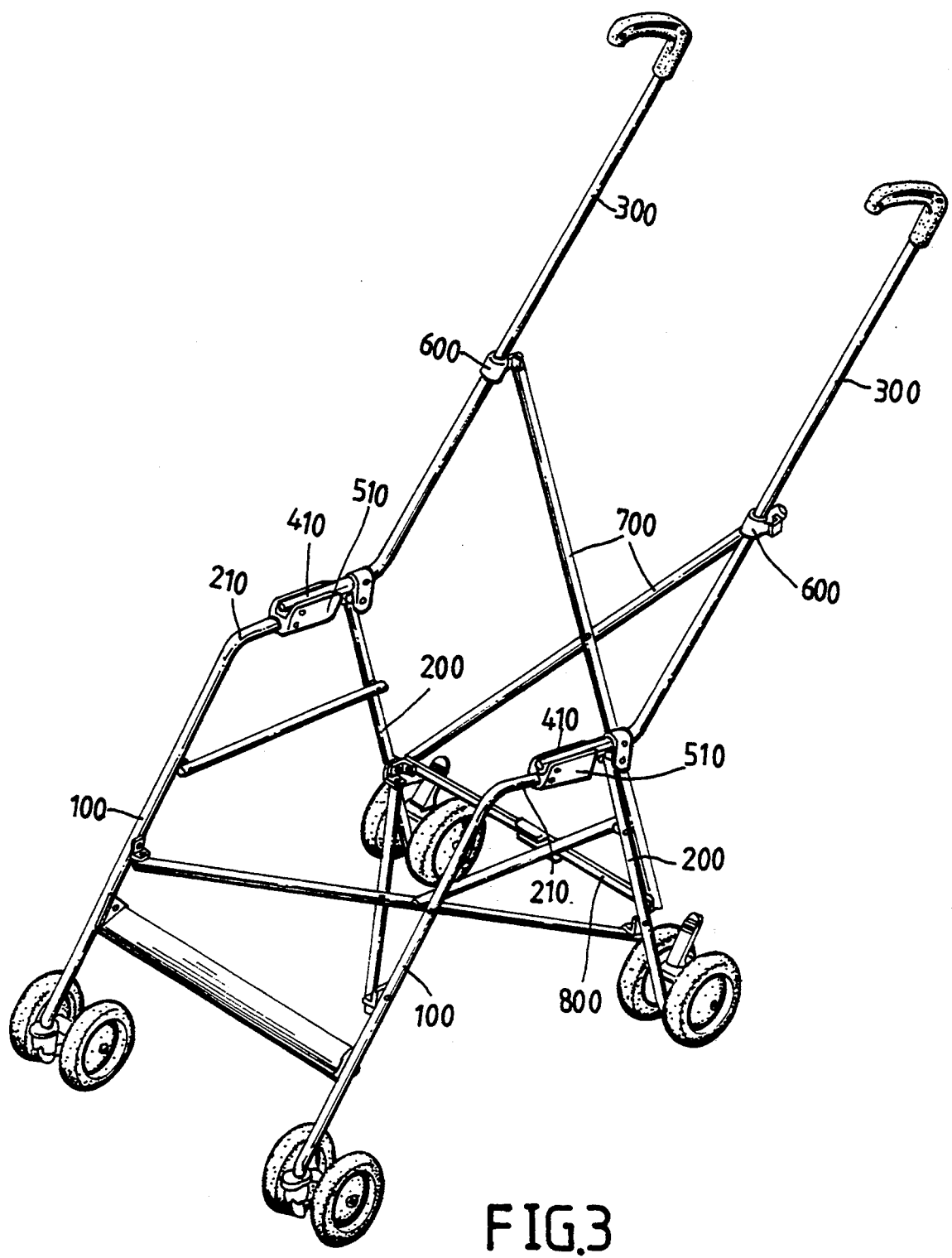
Figure 4:
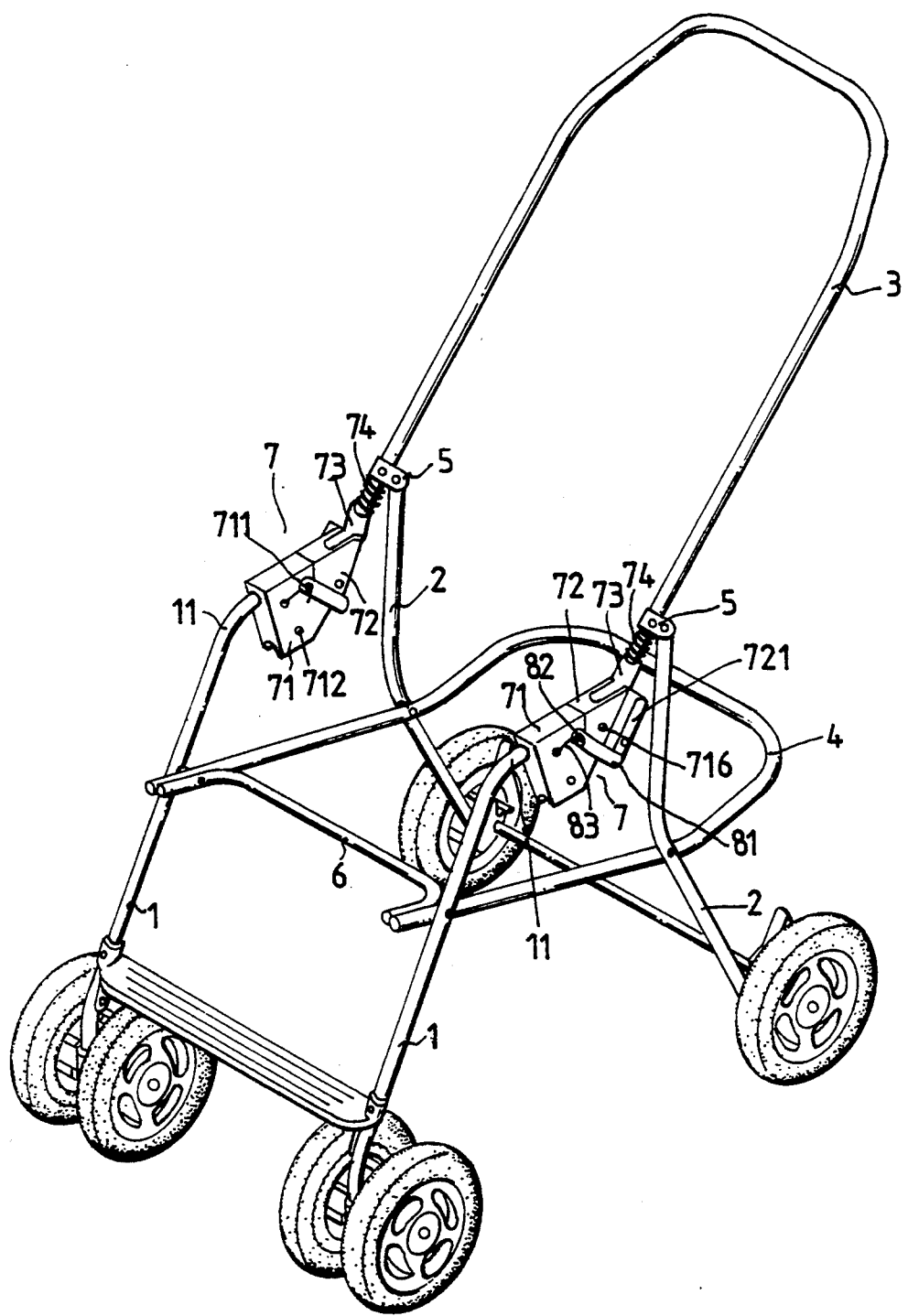
FIG. 4 is a perspective view of a baby stroller in accordance with the present invention.

Referring to FIG. 4, a baby stroller in accordance with the present invention comprises a pair of front legs 1, a handle means 3 pivotally coupled to the front legs 1 by two support means 7, a pair of rear legs 2 coupled to the handle means 3 by two couplers 5, a base 4, 6 pivotally coupled between the legs 1, 2, and the front legs 1 each including a bent portion 11 provided on top thereof for engaging with the support means 7.

Figure 5:
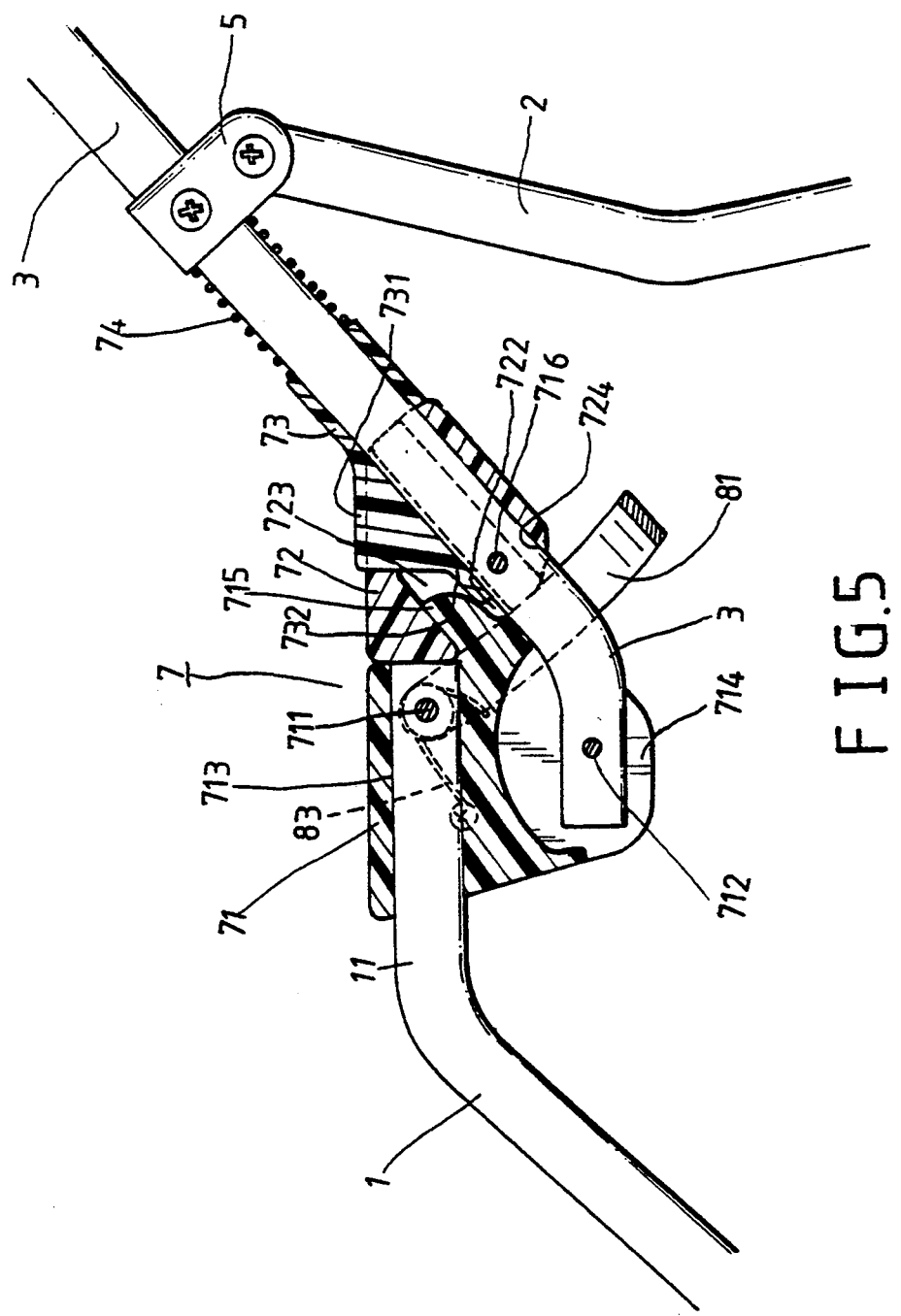
FIGS. 5 and 6 are cross sectional views illustrating the adjustable support means of the baby stroller.
Figure 8:
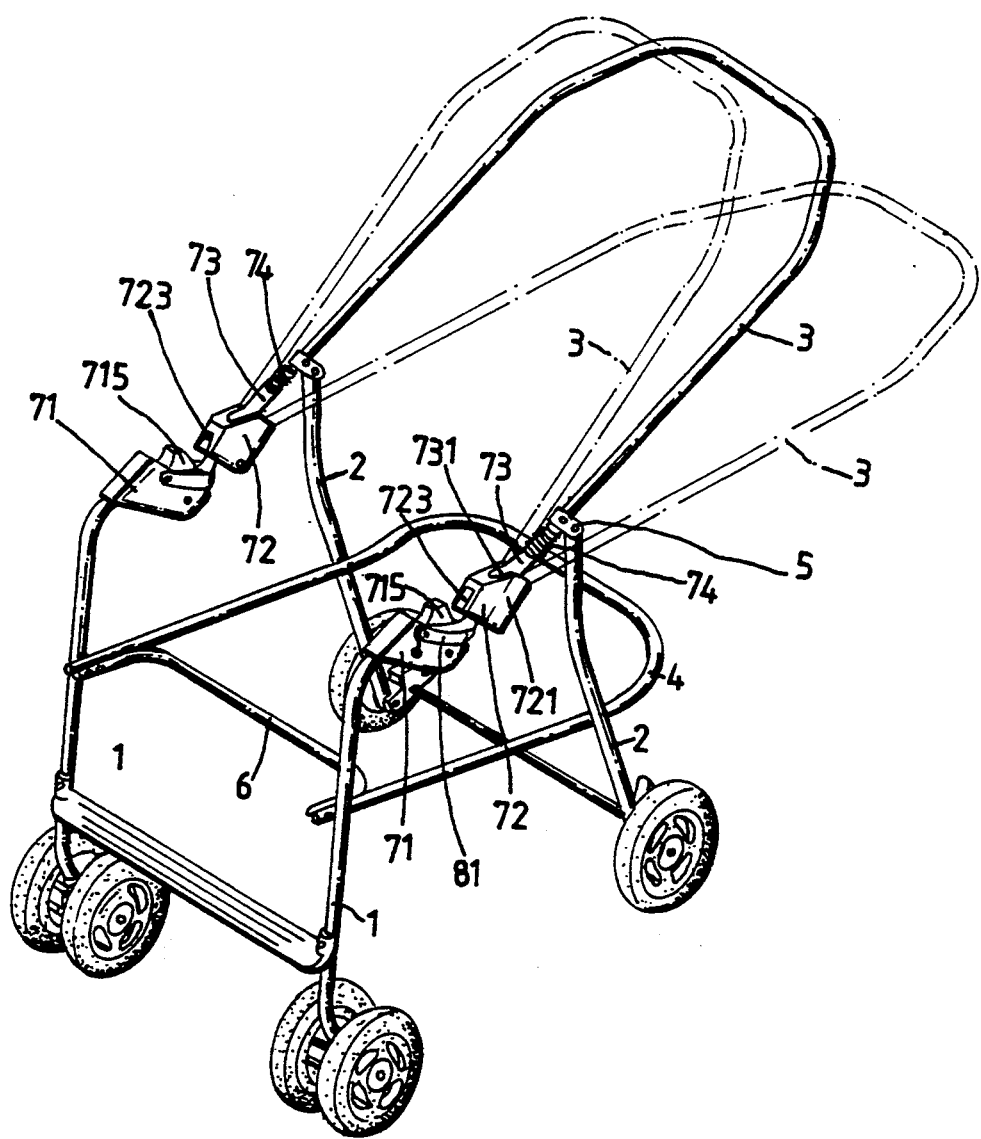
FIG. 8 is a perspective view illustrating the operation of the foldable baby stroller.

Referring to FIGS. 5. 6, 7A, 7B and 7C, each of the support means 7 includes a member 71 having an orifice 713 formed therein for engaging with the bent portion 11 of the front leg 1 and fixed to the bent portion 11 by a pin 711, the member 71 is pivotally coupled to the lower end of the handle means 3 by a pin 712 and includes a recess 714 for receiving the lower end of the handle means 3 and includes a protrusion 715 extended therefrom, a U-shaped retainer 81 includes two free ends pivotally coupled to the pin 711, a spring 83 is engaged on the pin 711 and includes one end fixed to the member 71 by a screw 84 and the other end engaged with the retainer 81 for biasing the retainer 81 toward the handle means 3, a sleeve 73 slidably engaged on the lower end of the handle means 3, a spring 74 biased between the sleeve 73 and the coupler 5 for biasing the sleeve 73 toward the retainer 81, the sleeve 73 includes a lump 731 and a projection 732 formed thereon, and a knob 72 is pivotally coupled to the lower end of the handle means 3 by a pin 716 and includes a bore 724 for engaging with the lower end of the handle means 3 and includes an opening 723 for receiving the protrusion 715 of the member 71, the knob 72 includes a flange 721 (FIG. 8) extended outward therefrom for rotating the knob 72.

Figure 6:
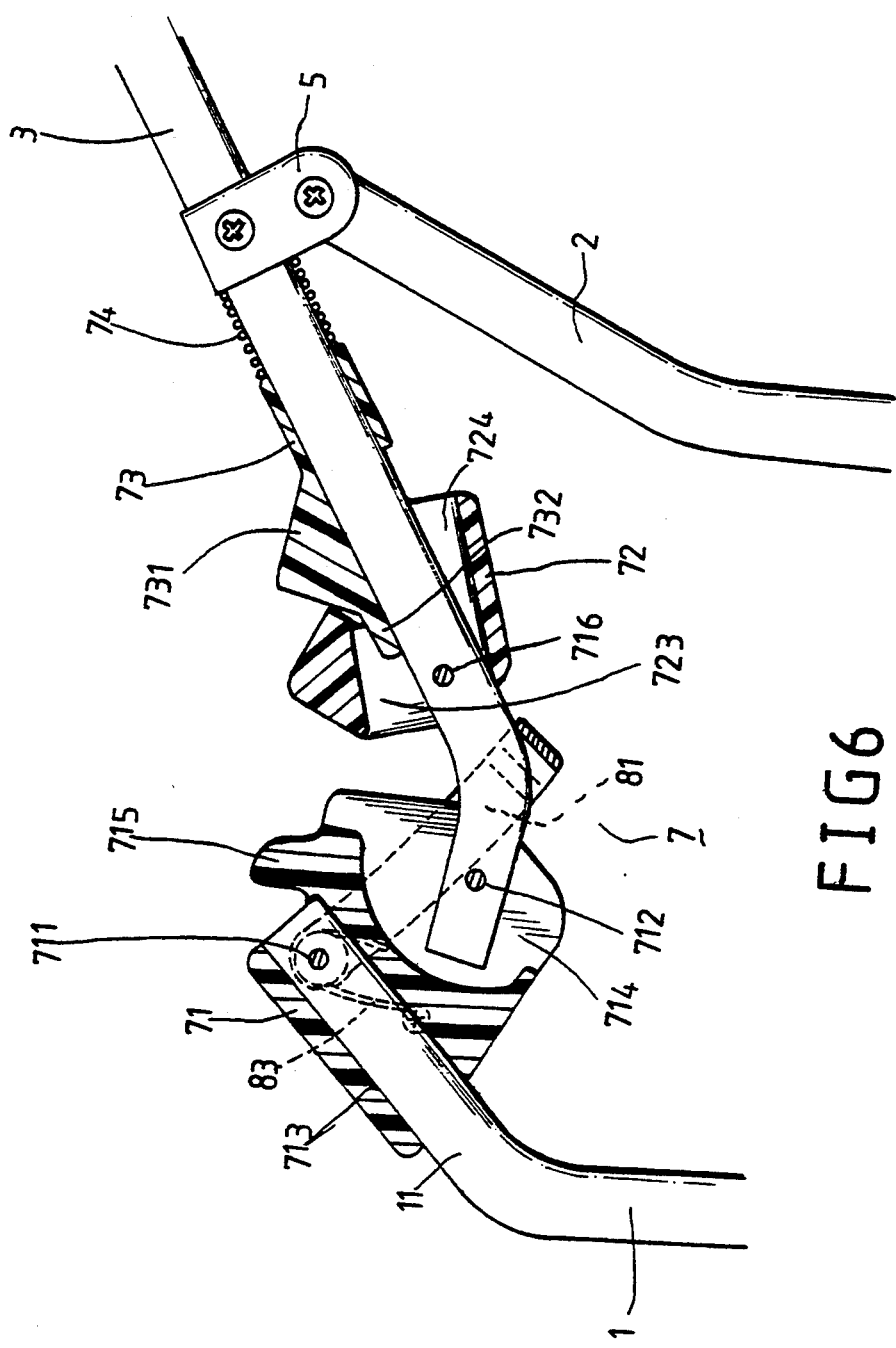

As shown in FIGS. 5 and 7A, the knob 72 is rotated to engage with the protrusion 715 by the lump 731 of the sleeve 73 which is biased toward the knob 72 and biased to engage with the knob by the spring 74, such that the front leg 1 can be stably coupled to the handle means 3. However, as shown in FIG. 6, when the knob 72 is rotated to force the sleeve 73 against the spring 74, the protrusion 715 can be disengaged from the knob 72 such that the handle means 3 can be rotated relative to the front leg 1, however, as shown in FIGS. 6 and 7B, the retainer 81 is biased to engage with the lower end of the handle means 3 by the spring 83 so as to retain the handle means 3 in an intermediate position relative to the front leg 1 and in order to prevent the handle means 3 from rotating in a fast speed relative to the front leg 1, the handle means 3 can further be rotated relative to the front leg 1 when the retainer 81 is rotated against the spring 83, best shown in FIG. 7C, accordingly, the handle means 3 can be adjusted relative to the front legs 1 by the support means 7, best shown in FIG. 8.

Accordingly, the baby stroller in accordance with the present invention includes a handle means which can be adjusted and rotated relative to the front legs.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A baby stroller comprising a pair of front legs each including an upper end, a pair of support means disposed on said upper ends of said front legs, a handle means including two lower ends engaged with said support means respectively, two couplers secured on said lower ends of said handle means, two rear legs each including an upper end pivotally coupled to said couplers respectively; each of said support means including a member fixed on said upper end of said front leg at a first pin and pivotally coupled to said lower end of said handle means at a second pin, a protrusion extended from said member, a retainer pivotally coupled to said first pin for engaging with said lower end of said handle means, first biasing means biasing said retainer to engage with said lower end of said handle means, a sleeve slidably engaged on said lower end of said handle means and including a lump formed thereon, a knob pivotally secured to said lower end of said handle means for engaging with said lump of said sleeve and including an opening for engaging with said protrusion of said member, second biasing means for biasing said sleeve toward said knob, said protrusion being retained in said opening of said knob when said sleeve is biased toward said knob by said second biasing means, and said protrusion being disengaged from said knob when said knob is rotated to move said sleeve against said second biasing means such that said handle means is rotatable about said second pin, said retainer being biased to engage with said lower end of said handle means by said first biasing means for retaining said handle means in place relative to said front leg.

* * * * *